United States Patent
Chang et al.

(10) Patent No.: US 11,556,476 B2
(45) Date of Patent: *Jan. 17, 2023

(54) ISA EXTENSION FOR HIGH-BANDWIDTH MEMORY

(71) Applicant: Samsung Electronics Co., Ltd., Suwon-si (KR)

(72) Inventors: Mu-Tien Chang, Santa Clara, CA (US); Krishna T. Malladi, San Jose, CA (US); Dimin Niu, Sunnyvale, CA (US); Hongzhong Zheng, Los Gatos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

This patent is subject to a terminal disclaimer.

(21) Appl. No.: 17/121,488

(22) Filed: Dec. 14, 2020

(65) Prior Publication Data

US 2021/0096999 A1    Apr. 1, 2021

Related U.S. Application Data

(63) Continuation of application No. 15/854,557, filed on Dec. 26, 2017, now Pat. No. 10,866,900.

(Continued)

(51) Int. Cl.
*G06F 12/0875* (2016.01)
*G06F 13/16* (2006.01)
(Continued)

(52) U.S. Cl.
CPC ........ *G06F 12/0875* (2013.01); *G06F 13/124* (2013.01); *G06F 13/1636* (2013.01);
(Continued)

(58) Field of Classification Search
None
See application file for complete search history.

(56) References Cited

U.S. PATENT DOCUMENTS

| 5,598,372 A | 1/1997 | Matsumoto et al. |
| 6,430,655 B1 | 8/2002 | Courtright et al. |

(Continued)

FOREIGN PATENT DOCUMENTS

| EP | 1 045 307 B1 | 7/2006 |
| JP | H 04-025961 A | 1/1992 |

(Continued)

OTHER PUBLICATIONS

Azarkhish (Memory Hierarchy Design for Next Generation Scalable Many-core Platforms), p. 157, Feb. 23, 2016 (Year: 2016).

(Continued)

*Primary Examiner* — Kaushikkumar M Patel
(74) *Attorney, Agent, or Firm* — Lewis Roca Rothgerber Christie LLP

(57) ABSTRACT

A method of processing in-memory commands in a high-bandwidth memory (HBM) system includes sending a function-in-HBM instruction to the HBM by a HBM memory controller of a GPU. A logic component of the HBM receives the FIM instruction and coordinates the instructions execution using the controller, an ALU, and a SRAM located on the logic component.

25 Claims, 2 Drawing Sheets

Related U.S. Application Data

(60) Provisional application No. 62/573,390, filed on Oct. 17, 2017.

(51) Int. Cl.
*G06F 13/12* (2006.01)
*G06F 9/30* (2018.01)

(52) U.S. Cl.
CPC ........ *G06F 13/1689* (2013.01); *G06F 9/3001* (2013.01); *G06F 9/30098* (2013.01); *G06F 2212/452* (2013.01)

(56) References Cited

U.S. PATENT DOCUMENTS

| | | |
|---|---|---|
| 7,873,886 B2 | 1/2011 | Robertson |
| 9,075,764 B2 | 7/2015 | Saar |
| 9,734,079 B2 | 8/2017 | Feekes et al. |
| 10,203,740 B2 | 2/2019 | Segawa et al. |
| 11,074,169 B2 | 7/2021 | Murphy |
| 2002/0013881 A1 | 1/2002 | Delp et al. |
| 2002/0018513 A1 | 2/2002 | Curry et al. |
| 2003/0074649 A1 | 4/2003 | Poulsen et al. |
| 2006/0218376 A1 | 9/2006 | Pechanek |
| 2009/0219446 A1 | 9/2009 | Beric et al. |
| 2013/0332666 A1 | 12/2013 | Haruki |
| 2014/0040532 A1 | 2/2014 | Watanabe et al. |
| 2015/0199266 A1 | 7/2015 | Franchetti et al. |
| 2015/0277911 A1 | 10/2015 | Khartikov et al. |
| 2016/0098200 A1 | 4/2016 | Guz et al. |
| 2016/0239278 A1 | 8/2016 | Che |
| 2016/0342526 A1 | 11/2016 | Chang et al. |
| 2017/0255390 A1 | 9/2017 | Chang et al. |
| 2017/0263306 A1 | 9/2017 | Murphy |
| 2017/0278213 A1 | 9/2017 | Eckert et al. |
| 2017/0344366 A1* | 11/2017 | Beard .................. G06F 12/084 |
| 2017/0344479 A1 | 11/2017 | Boyer et al. |
| 2018/0101483 A1* | 4/2018 | Catthoor ............. G06F 12/0897 |

FOREIGN PATENT DOCUMENTS

| | | |
|---|---|---|
| JP | 2009-514479 A | 4/2009 |
| JP | 2012-038293 A | 2/2012 |
| JP | 2013-242823 A | 12/2013 |
| JP | 2015-064676 A | 4/2015 |
| JP | 2016-532933 A | 10/2016 |
| WO | WO 2016/066487 A1 | 5/2016 |
| WO | WO 2016/209406 A1 | 12/2016 |

OTHER PUBLICATIONS

Ahn et al. (PIM-Enabled Instructions: A Low-Overhead, Locality-Aware Processing-in-Memory Architecture) ACM ISBN 978-1-4503-0, Jun. 13-17, 2015, pp. 336-348.

Pattnaik et al. (Scheduling Techniques for GPU Architectures with Processing-in-Memory Capabilities) ACM Sep. 11-15, 2016, pp. 31-44.

* cited by examiner

ISA EXTENSION FOR HIGH-BANDWIDTH MEMORY

CROSS-REFERENCE TO RELATED APPLICATION(S)

This application is a continuation application of U.S. patent application Ser. No. 15/854,557, filed on Dec. 26, 2017 which claims priority to, and the benefit of, U.S. Provisional Patent Application No. 62/573,390, filed on Oct. 17, 2017, the contents of which are incorporated herein by reference in its entirety.

BACKGROUND

1. Field

Some embodiments of the present disclosure relate generally to memory bandwidth management, and may also relate to a high-bandwidth memory (HBM) system including a processor and a memory controller on a HBM logic die, and to methods of processing in the HBM.

2. Description of the Related Art

HBM is often used as high performance memory for graphics processing units (GPUs). HBM has the advantage of having a very wide bus in comparison to typical DRAM. Current HBM architecture includes multiple stacked DRAM dies (e.g. dice) and a logic die that functions as a buffer in the HBM and a HBM memory controller in the GPU. Further performance gains may be achieved by adding process in memory (e.g. in-memory processing) capabilities to memory systems, however, any changes to the HBM should result in minimal changes to the existing GPU ecosystem.

The above information is only for enhancement of understanding of the background of embodiments of the present disclosure, and therefore may contain information that does not constitute prior art.

SUMMARY

Some embodiments of the present disclosure provide a system and method for coordinating memory commands in a high-bandwidth memory HBM system.

According to some embodiments, as system and method of processing in-memory commands in a high-bandwidth memory (HBM) system, includes sending, by a HBM memory controller of a GPU, a function-in-HBM (FIM) instruction to a HBM and receiving, at a logic component of the HBM, the FIM instruction. The logic component may include a controller, an Arithmetic Logic Unit (ALU), and a SRAM. The logic component coordinates the execution of the FIM instruction, by using at least one of the controller, the ALU, or the SRAM, based on the FIM instruction.

According to some embodiments, coordinating the execution of the FIM instruction involves identifying the FIM instruction as a computational FIM instruction. The computational FIM instruction has an operation and at least one data location. Coordinating the exection of the computational FIM instruction includes retrieving at least one data from a DRAM of the HBM according to the at least one data location, providing the at least one data and the operation to the ALU, executing, by the ALU, the operation on the at least one data and storing the result of the execution in the DRAM.

According of some embodiments, an operation may be an atomic operation and a data type and wherein the at least one data location comprises at least one of a destination register, a memory address, a source register, a constant, or a reference register.

According to some embodiments, the atomic operation comprises at least one of an ADD, SUBTRACT, EXCHANGE, MAX, MIN, INCREMENT, DECREMENT, COMPARE-AND-SWAP, AND, OR, XOR, or NOT function.

According to some embodiments, the operation may be an ALU operation and a DRAM access operation and the at least one data location comprises a destination register and at least one source register.

According to some embodiments, the DRAM access operation may include a paired load instruction or a paired store instruction.

According to some embodiments, coordinating the execution of the FIM instruction may include identifying the FIM instruction as a FIM move instruction by the controller. The FIM move instruction may include a source register and a destination register. The controller may retrieve the at least one data from a DRAM of the HBM according to the source register and store the at least one data in the DRAM at the destination register.

According to some embodiments, coordinating the execution of the FIM instruction my include identifying the FIM instruction as a FIM scratchpad instruction. The FIM scratchpad instruction includes at least one of a source register or a destination register. According to some embodiments, coordinating the FIM scratchpad instruction may include adjusting a timing parameter of the controller from a DRAM timing parameter to a SRAM timing parameter and executing the FIM scratchpad instruction on the SRAM, using to the SRAM timing parameter.

According to some embodiments, coordinating the execution of the FIM instruction on the GPU, by the HBM controller, when the at least one data location comprises a GPU cache.

BRIEF DESCRIPTION OF THE DRAWINGS

Some embodiments can be understood in more detail from the following description taken in conjunction with the accompanying drawings, in which.

DETAILED DESCRIPTION

Figure 1:
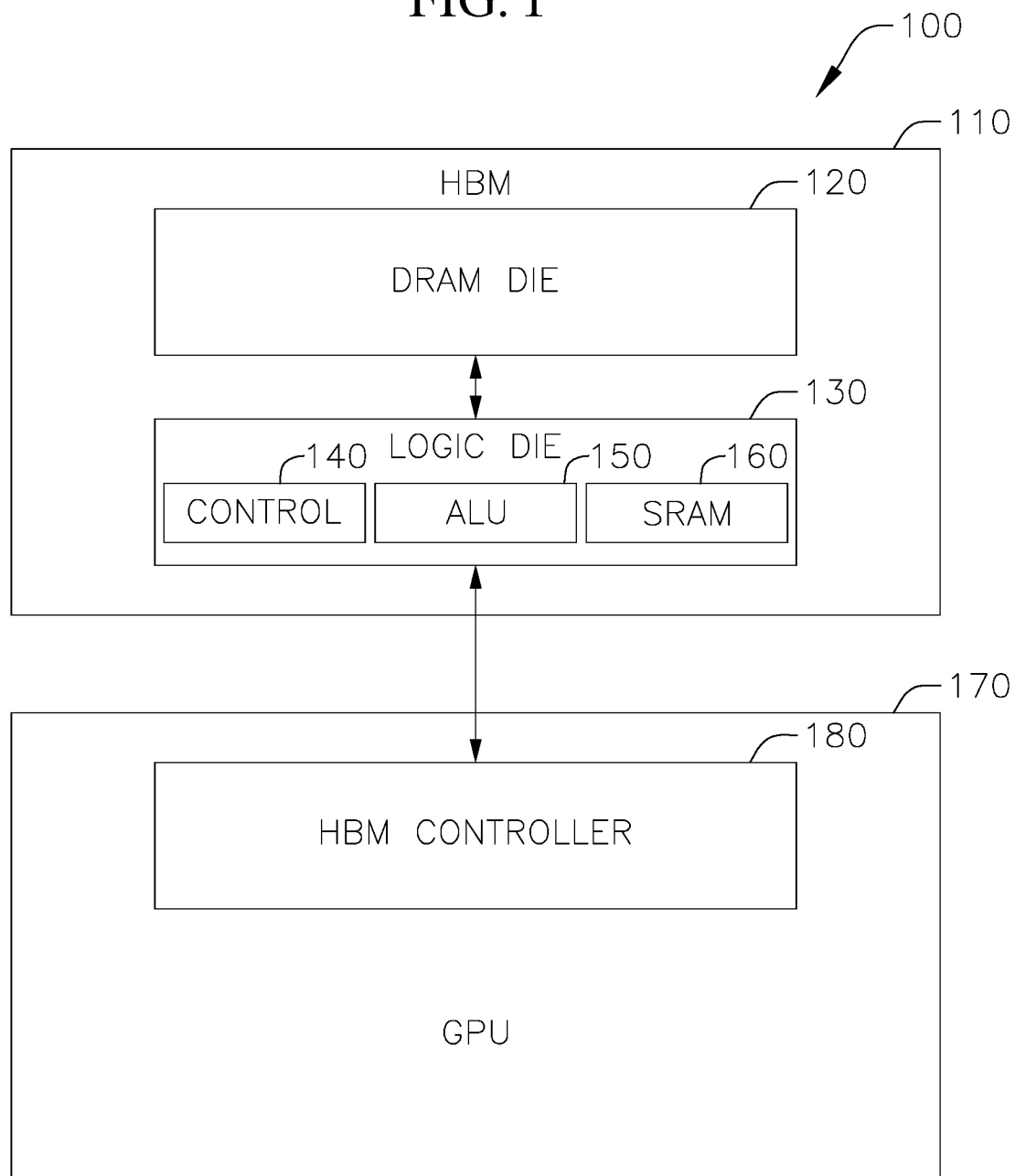
FIG. 1 is a block diagram of a high-bandwidth memory HBM system according to various embodiments.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram of an architecture of a high-bandwidth memory HBM system according to an embodiment of the present disclosure.

Referring to FIG. 1, embodiments of the present disclosure provide a system for a function-in-HBM ("Function-in-memory") (FIM) HBM system 100 and an Instruction Set Architecture (ISA) extension for HBM. The HBM system 100 supports additional computational resources to be integrated in the HBM 110. For example, in various embodiments, the HBM system 100 allows for some data computations and movements to be performed in-memory, and also provides a high-capacity scratchpad. The HBM system 100 includes at least one HBM 110 connected to a GPU 170. In various embodiments, the HBM 110 includes a DRAM 120 (e.g. one or more DRAM dies) and a logic component 130 (e.g. a logic die). In various embodiments, the logic component 130 includes a controller 140, an Arithmetic Logic Unit (ALU) 150, and an SRAM 160, and the GPU 170 includes a HBM memory controller 180 for interfacing with the HBM 110.

According to various embodiments, the controller 140 is configured to coordinate the execution of instructions from the GPU 170. The instructions may include both regular instructions and FIM instructions. For example, regular instructions (e.g. traditional load and store functions, not function-in-HBM instructions) are sent by the HBM memory controller 180 and received by the controller 140 and executed in a conventional manner. In other examples, the controller 140 coordinates the execution of in-memory functions (e.g. FIM instructions). For example, the controller 140 may execute data movement operations (e.g. a load/store pair instructions). In some examples, controller 140 may execute FIM instructions that were originally a plurality of regular instructions. For example, the controller 140 may coordinate the execution of computational FIM instructions that utilize the ALU 150 (e.g. atomic instructions and ALU instructions). In these cases, the controller 140 coordinates the execution of these instructions by retrieving data from the DRAM 120 and providing the data (and ALU operation) to the ALU 150 for processing. The result is then stored in the DRAM 120 or may be returned to the GPU 170. In some examples, the FIM instruction includes one or more ALU instruction that has been paired with a load or store instruction. In another embodiment, the controller 140 is also configured to coordinate the execution of scratchpad read and write instructions. Each of these types of FIM functions will be discussed in detail below.

According to various embodiments, the ALU 150 is configured for executing various computational operations (e.g. simple compute commands). For example, the ALU 150 may be a 32-bit ALU configured for executing arithmetic operations, bitwise, shift operations, and the like. For example, the ALU 150 may be configured to execute ADD, SUBTRACT, EXCHANGE, MAX, MIN, INCREMENT, DECREMENT, COMPARE-AND-SWAP, AND, OR, and XOR operations. The ALU 150 may be utilized for atomic and non-atomic operations. In various embodiments, the controller 140 provides operations and manages the input of data to the ALU 150 and the output of data from the ALU 150 to the DRAM 120. In other embodiments the ALU 150 is capable of retrieving data and storing data directly in the DRAM 120. In other embodiments, the controller 140 is responsible for retrieving and storing data from/in the DRAM 120.

According to various embodiments, the SRAM 160 is configured as a low latency scratchpad. In some embodiments, the SRAM 160 may share the same command/address (CA) and Data (DQ) interfaces with the DRAM 120, and in other embodiments, the SRAM 160 may have its own CA and DQ interfaces. In various embodiments, the SRAM 160 includes its own address range that is distinct from the DRAM's 120 address range. The controller 140 may use an incoming read/write instruction's address to determine if the request is a scratchpad operation. In other embodiments, the GPU 170 may send specifically designated scratchpad instructions to the controller 140. When a command utilizes the SRAM 160, the controller 140 may alter its timing parameters to operate according to the SRAM's 160 timing parameters (e.g. faster/lower latency than DRAM 120 timing parameters). Use of the SRAM 160 may be designated by a user (e.g. a programmer) and space in the SRAM 160 may be allocated during runtime. In operation, the scratchpad may operate similar to a GPU's L1 scratchpad (e.g. providing low latency memory). Since the GPU's L1 scratchpad is typically small (15 kB per core), an extended HBM scratchpad (e.g. the SRAM 160) allows for improved performance over utilizing DRAM 120.

According to various embodiments, a FIM ISA is provided for utilizing the added resources available in the HBM 110. For example, the FIM ISA may extend previous instruction sets to allow for operations that include computational FIM instructions (e.g. FIM atomic instructions and FIM ALU instructions), data movement FIM instructions, and FIM scratchpad instructions. Each FIM instruction includes a FIM designator identifying the instruction as FIM, an operation or operations for execution by the HBM, and data locations (e.g. registers, memory, provided constants, etc.). In one embodiment, a FIM instruction may be formatted as: <designator>.<operation>.<data location 1><data location 2>.

In various embodiments, an instruction may be designated as a FIM instruction by a user (e.g. a programmer), by the compiler, or by the GPU. For example, in some programming languages, a user may designate the location (e.g. in-memory, the GPU, or a CPU) of where an operation takes place or what memory is utilized. In another example, a compiler may be configured to identify commands that can be done in the HBM 110 and prioritize doing FIM commands in the HBM 110 over the GPU 170. In another example, the GPU 170 may analyze the source and destination memory addresses to determine whether a FIM instruction is available. In some cases, the GPU 170 may analyze the memory addresses and determine that at least one of the addresses is located in the GPU cache or other non-HBM memory, in these cases, a normal instruction will be executed (e.g. a non-FIM instruction).

Figure 2:
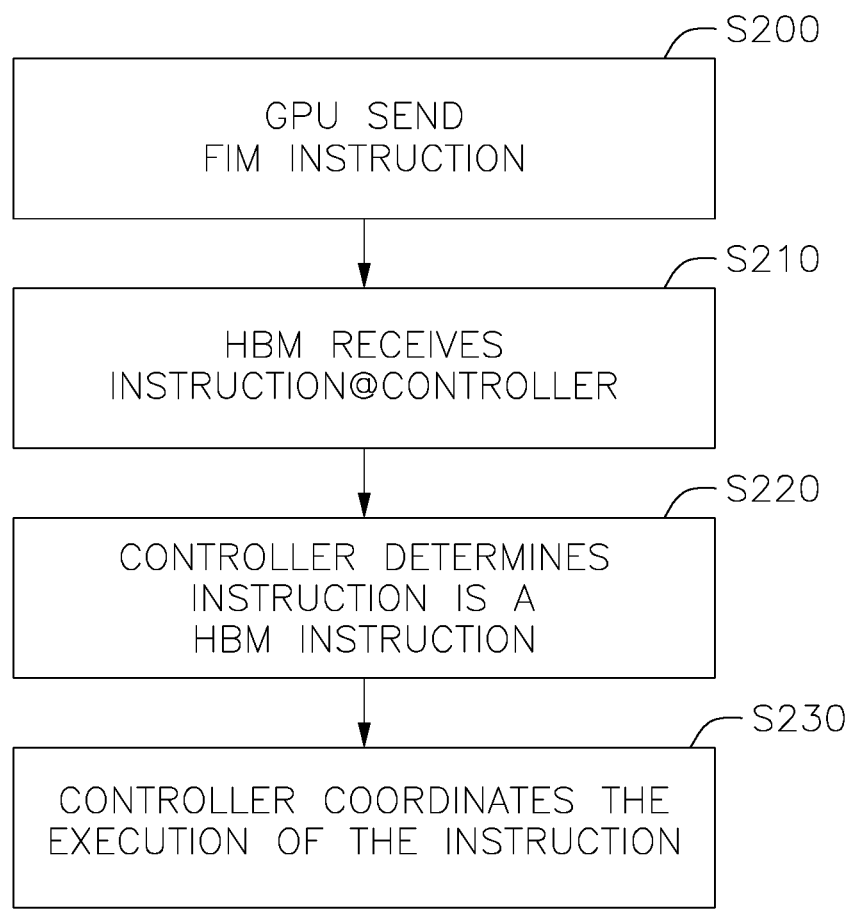
FIG. 2 is a flow diagram illustrating example operations for processing of instructions from a FIM Instruction Set Architecture (ISA), according to some example embodiments.

FIG. 2 is a block diagram of the processing of instructions from a FIM Instruction Set Architecture (ISA).

According to various embodiments, the GPU 170 is configured to send instructions to the HBM 110 (S200). The GPU 170 includes the HBM controller 180 that processes and sends the requests to the HBM 110 and handles any return information. In some embodiments, the HBM controller 180 may also verify that a FIM instruction is appropriate by evaluating the locations of the memory addresses in the FIM instruction. For example, when the address are on different HBMs or if one of the addresses is for the GPU's 170 cache local cache, the FIM instruction may not be appropriate. In some embodiments, verifying the FIM instruction may be done in an earlier GPU pipeline stage before being sent to the HBM 110. For example, in some embodiments, the GPU local cache controller may verify that the FIM instruction is appropriate. The HBM 110 receives the FIM instruction at the logic component 130 (S210). The controller 140 processes the instruction and coordinates the execution. The controller 140 may which includes, verifying that the instruction is a FIM instruction and determines the operation of the instruction (S220). For example, the controller will determine if the instruction is a computational instruction utilizing the ALU 150, whether it is a move instruction, or whether it is a scratchpad instruction. The controller 140 then coordinates the execution of the instruction by either completing the instruction itself (e.g. a move instruction) or by employing the requisite logic hardware (e.g. the ALU 150 or the SRAM 160) (S230).

According to various embodiments, the ISA includes computational instructions. In various embodiments, the controller 140 receives the computational instructions and coordinates their execution on the ALU 150. The computational instructions may include FIM atomic instructions and FIM ALU instructions.

According to various embodiments, the HBM 110 is configured to process FIM atomic instructions using the FIM ISA. Atomic instructions may generally be decomposed into three steps: reading data from a memory location; performing a function on the data (e.g. ADD, SUBTRACT, etc.); and writing the resulting data back to some memory location. Upon receiving a FIM atomic instruction, the HBM 110 can execute all three steps internally. To complete the instruction, in some embodiments, the FIM atomic instruction includes additional information sent by the GPU 170 to the HBM 110 when compared to a conventional atomic instruction. For example, the GPU 170 may send a FIM atomic instruction that includes an atomic operation, a data type, a destination register, a source register, a reference register (e.g. for compare-and-swap functions), a memory address, and a function type.

According to various embodiments, the controller 140 receives a FIM atomic instruction from the GPU's HBM controller 180. The controller 140 reads the instruction and determines it is a FIM instruction using the FIM designator. The controller 140 uses the operation to determine the instruction is a FIM atomic instruction. Besides signaling that the function is a FIM atomic instructions, the operation also indicates the type of function to be performed by the ALU 150 (e.g. atomic add, atomic compare-and-swap; atomic OR, etc.) and type of data being operated on (e.g. 32-bit signed integer; 32-bit unsigned integer; etc.). The controller 140 then reads the data from the provided data location and provides the data to the ALU 150 along with the function. The ALU 150 performs the function on the data and the result is stored at the original data location.

In one example, the general format of the FIM atomic instruction is: fim.atom.<function>.<data type><destination register><memory address><source register or constant><reference register>. Table 1 includes some example functions with example values.

TABLE 1

Example FIM Atomic Instructions

| Function | Example FIM Instruction |
| --- | --- |
| General Format | fim.atom.<function><data location 1><data location 2> |
| ADD | fim.atom.add.u32 % r6, [% rl3], −10 |
| Exchange | fim.atom.exch.b32 % r7, [% rl4], % r4 |

TABLE 1-continued

Example FIM Atomic Instructions

| Function | Example FIM Instruction |
| --- | --- |
| Find Max | fim.atom.max.s32 % r8, [% rl5], % r4 |
| Find Min | fim.atom.min.s32 % r9, [% rl6], % r4 |
| Increment | fim.atom.inc.u32 % r10, [% rl7], 17 |
| Decrement | fim.atom.dec.u32 % r11, [% rl8], 137 |
| Compare-And-Swap | fim.atom.cas.b32 % r13, [% rl9], % r12, % r4 |
| AND | fim.atom.and.b32 % r17, [% rl10], % r16 |
| OR | fim.atom.or.b32 % r19, [% rl11 ], % r18 |
| XOR | fim.atom.xor.b32 % r20, [% rl12], % r4 |

In various embodiments, FIM instruction ISA includes instructions for FIM ALU instructions. Typical operations performed by the GPU may require accompanying load and store instructions to pull necessary data from memory and place the results. In some embodiments, the FIM ALU instructions can collapse traditional function plus accompanying load and store instructions into a single FIM ALU instruction. In one example, the general format of the FIM ALU instruction includes a FIM designator, an operation with an ALU operation and a paired load/store operation; and at least one data location. For example, the FIM ALU instruction may be formatted:

fim.<function>.<load/store><destination register><source register><load register>. For example, an ALU instruction may be paired with a load and/or store instruction(s) as shown in Table 2:

TABLE 2

Example FIM ALU Load/Store Instructions

| Non-FIM instruction | Example FIM Instruction |
| --- | --- |
| ld $r1, [$r2]<br>add $r3, $r0, $r1 | fim.add.ld $r3, $r0, [$r2] |
| add $r3, $r0, $r1<br>st [$r2], $r3 | fim.add.st [$r2], $r0, $r1 |

In one example, the operation of a FIM ALU instruction is similar to the operation of the FIM atomic instructions. For example, according to various embodiments, the controller 140 receives a FIM ALU instruction from the GPU's HBM controller 180. The controller 140 reads the instruction and determines it is a FIM instruction using the FIM designator. The controller 140 uses the operation to determine the instruction is a FIM ALU instruction and the type of function to be performed by the ALU 150 (e.g. add, exchange, MIN, MAX, OR, etc.). The controller 140 then reads the data from the provided data location and provides the data to the ALU 150 along with the function. The ALU 150 performs the function on the data and the result is stored at the original or indicated data location.

In various embodiments, HBM 110 and FIM ISA are configured for FIM move instructions. A move instruction may be identified as a load instruction paired with a corresponding store instruction. When the address of the load and store are located within the same HBM, the function may be executed in-memory. In various embodiments, the paired load and store functions may be merged into a single FIM move instruction. Table 3 shows an example load/store instruction.

TABLE 3

Example FIM move instruction

| Non-FIM instruction | Example FIM instruction |
|---|---|
| ld $r1, [$r2]<br>st [$r3], $r1 | fim.mov [$r3], [$r2] |

Upon receiving the FIM move instruction, the controller 140 recognizes that the instruction is a FIM instruction due to the FIM designator and that the operation is a move operation. The controller 140 then reads the data from the source address and stores the data in the destination address. In various embodiments, the compiler may be configured to identify pairs of load and store instructions that can be condensed into a single FIM move instruction as shown in Table 3. In various embodiments, the GPU 170 may also analyze the move instruction before sending the instruction to the HBM 110 and determine if the FIM move instruction is appropriate. For example, the GPU 170 (e.g. at the HBM controller 180) may analyze the source and destination memory addresses and determine if one of the addresses is in the GPU cache. In this example, the GPU 170 will split the instruction into normal load and store instructions.

In various embodiments, the HBM 110 and FIM ISA are configured to utilize the SRAM 160 as a low latency scratchpad. In various embodiments, the controller 140 is configured to identify FIM scratchpad instructions. As discussed above, the SRAM 160 includes a specific address range that is distinct from the DRAM's 120 address range. The controller 140 is configured to identify whether a request corresponds to a DRAM 120 memory address or a SRAM 160 memory address. In various embodiments, the ISA includes specific scratchpad commands. For example, the ISA may include a FIM read scratchpad (e.g. FIM.RD_SP) and a FIM write scratchpad command (e.g. FIM.WR_SP). In his example, the controller 140 may not evaluate the memory address of an incoming command.

SRAM 160 operates with lower latency (e.g. is faster) than DRAM 120. The scratchpad, therefore, may render the HBM 110 nondeterministic with regards to data load and store times. In various embodiments, the controller 140 is configured to coordinate the execution of the instructions by operating according to the DRAM's 120 timing parameters when executing DRAM memory related functions and according to the SRAM's 160 timing parameters during SRAM memory functions (e.g. FIM scratchpad instructions). Therefore when a FIM scratchpad instruction is received, the controller 140 may adjust its timing parameters to correspond the SRAM's 160 timing parameters and execute the FIM read/write scratchpad command.

In various embodiments, a user defines data structures that utilize the SRAM 160 as a low latency scratchpad. Once the user has defined a data structure as using the scratchpad, the compiler will translate the request to include a specifier (e.g. llsp in assembly) and the GPU 170 will allocate the space in the HBM 110 accordingly.

Accordingly, the above described embodiments of the present disclosure provide a high-bandwidth memory (HBM) system and instruction set architecture (ISA).

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A method of processing in-memory commands in a high-bandwidth memory (HBM) system, the method comprising:
   sending, by an HBM memory controller of a processor, a function-in-HBM (FIM) instruction to an HBM, wherein the FIM instruction comprises an operation and a designation that the FIM instruction is a scratchpad operation;
   receiving the FIM instruction at a logic component of the HBM, wherein the logic component comprises: a controller, an Arithmetic Logic Unit (ALU), and a SRAM configured as a scratchpad; and
   coordinating execution of the FIM instruction, by the logic component using the controller and at least one of a DRAM, the ALU, or the SRAM.

2. The method of claim 1, wherein coordinating the execution of the FIM instruction comprises:
   identifying the FIM instruction as a computational FIM instruction by the controller, wherein the computation FIM instruction comprises at least one data location;
   retrieving, by the controller, at least one data according to the at least one data location;
   providing, by the controller, the at least one data and the operation to the ALU;
   executing, by the ALU, the operation on the at least one data; and
   storing the result of the execution in the HBM.

3. The method of claim 2, wherein the operation comprises an atomic operation and a data type and wherein the at least one data location comprises at least one of a destination register, a memory address, a source register, a constant, or a reference register.

4. The method of claim 3, wherein the atomic operation comprises at least one of an ADD, SUBTRACT, EXCHANGE, MAX, MIN, INCREMENT, DECREMENT, COMPARE-AND-SWAP, AND, OR, XOR, or NOT function.

5. The method of claim 2, wherein the operation comprises an ALU operation and a SRAM access operation and wherein the at least one data location comprises a destination register and at least one source register.

6. The method of claim 5, wherein the SRAM access operation comprises a paired load instruction or a paired store instruction.

7. The method of claim 1, wherein coordinating the execution of the FIM instruction further comprises:
   identifying the FIM instruction as a FIM move instruction by the controller using the operation, wherein the FIM move instruction comprises a source register and a destination register;
   retrieving, by the controller, at least one data from the SRAM according to the source register; and storing the at least one data, by the controller, in the SRAM according to the destination register.

8. The method of claim 1, wherein coordinating the execution of the FIM instruction further comprises:
identifying the FIM instruction as a FIM scratchpad instruction by the controller using the operation, wherein the FIM scratchpad instruction comprises at least one of a source register and a destination register;
adjusting a timing parameter of the controller from a DRAM timing parameter to a SRAM timing parameter; and
executing the FIM scratchpad instruction, by the controller, on the SRAM, according to the SRAM timing parameter.

9. The method of claim 1, wherein the FIM instruction comprises at least one data location and the method further comprises coordinating the execution of the FIM instruction on the processor, by the HBM controller, in response to the at least one data location comprising a processor cache.

10. A high-bandwidth memory (HBM), the HBM comprising:
a DRAM; and
a logic component, comprising: a controller, an Arithmetic Logic Unit (ALU), and a SRAM configured as a scratchpad, wherein the logic component is configured to execute instructions that cause the logic component to:
coordinate the execution of a FIM instruction, by the logic component using at least one of the DRAM, the controller, the ALU, or the SRAM, based on the FIM instruction, wherein the FIM instruction comprises an operation, a FIM designator that identifies the FIM instruction as FIM, and a designation that the FIM instruction is a scratchpad operation.

11. The HBM of claim 10, wherein coordinating the execution of the FIM instruction further comprises:
identifying the FIM instruction as a computational FIM instruction by the controller, wherein the computation FIM instruction comprises at least one data location;
retrieving, by the controller, at least one data according to the at least one data location;
providing, by the controller, the at least one data and the operation to the ALU;
executing, by the ALU, the operation on the at least one data; and
storing the result of the execution in the HBM.

12. The HBM of claim 11, wherein the operation comprises an atomic operation and a data type and wherein the at least one data location comprises at least one of a destination register, a memory address, a source register, a constant, or a reference register.

13. The HBM of claim 12, wherein the atomic operation comprises at least one of an ADD, SUBTRACT, EXCHANGE, MAX, MIN, INCREMENT, DECREMENT, COMPARE-AND-SWAP, AND, OR, XOR, or NOT function.

14. The HBM of claim 11, wherein the operation comprises an ALU operation and a SRAM access operation and wherein the at least one data location comprises a destination register and at least one source register.

15. The HBM of claim 14, wherein the SRAM access operation comprises a paired load instruction or a paired store instruction.

16. The HBM of claim 10, wherein coordinating the execution of the FIM instruction further comprises:
identifying the FIM instruction as a FIM move instruction by the controller using the operation, wherein the FIM move instruction comprises a source register and a destination register;
retrieving, by the controller, at least one data from the SRAM according to the source register; and
storing the at least one data, by the controller, in the SRAM according to the destination register.

17. The HBM of claim 10, wherein coordinating the execution of the FIM instruction further comprises:
identifying the FIM instruction as a FIM scratchpad instruction by the controller using the operation, wherein the FIM scratchpad instruction comprises at least one of a source register and a destination register;
adjusting a timing parameter of the controller from a DRAM timing parameter to a SRAM timing parameter; and
executing the FIM scratchpad instruction, by the controller, on the SRAM, according to the SRAM timing parameter.

18. An HBM system comprising:
an HBM comprising:
a DRAM die comprising a DRAM; and
a logic die comprising a controller, an Arithmetic Logic Unit (ALU), and a SRAM, wherein the SRAM is configured as a scratchpad;
a memory controller separate from the HBM, and configured to send an instruction to the controller;
wherein the controller is configured to receive the instruction, and to forward the instruction to the DRAM on the DRAM die in response to the instruction being a regular instruction and to coordinate execution of the instruction in response to the instruction being a Function-in-HBM (FIM) instruction, wherein the FIM instruction comprises an operation, a FIM designator that identifies the FIM instruction as FIM, and a designation that the FIM instruction is a scratchpad operation; and
wherein the execution of the instruction is performed using the controller and at least one of the DRAM, the ALU or the SRAM.

19. The HBM of claim 18, wherein coordinating the execution of the FIM instruction comprises:
identifying the FIM instruction as a computational FIM instruction by the controller, wherein the computation FIM instruction comprises at least one data location;
retrieving, by the controller, at least one data according to the at least one data location;
providing, by the controller, the at least one data and the operation to the ALU;
executing, by the ALU, the operation on the at least one data; and
storing the result of the execution in the HBM.

20. The HBM of claim 19, wherein the operation comprises an atomic operation and a data type and wherein the at least one data location comprises at least one of a destination register, a memory address, a source register, a constant, or a reference register.

21. The HBM of claim 20, wherein the atomic operation comprises at least one of an ADD, SUBTRACT, EXCHANGE, MAX, MIN, INCREMENT, DECREMENT, COMPARE-AND-SWAP, AND, OR, XOR, or NOT function.

22. The HBM of claim 19, wherein the operation comprises an ALU operation and a SRAM access operation and wherein the at least one data location comprises a destination register and at least one source register.

23. The HBM of claim 22, wherein the SRAM access operation comprises a paired load instruction or a paired store instruction.

24. The HBM of claim 18, wherein coordinating the execution of the FIM instruction further comprises:
   identifying the FIM instruction as a FIM move instruction by the controller using the operation, wherein the FIM move instruction comprises a source register and a destination register;
   retrieving, by the controller, at least one data from the SRAM according to the source register; and
   storing the at least one data, by the controller, in the SRAM according to the destination register.

25. The HBM of claim 18, wherein coordinating the execution of the FIM instruction further comprises:
   identifying the FIM instruction as a FIM scratchpad instruction by the controller using the operation, wherein the FIM scratchpad instruction comprises at least one of a source register and a destination register;
   adjusting a timing parameter of the controller from a DRAM timing parameter to a SRAM timing parameter; and
   executing the FIM scratchpad instruction, by the controller, on the SRAM, according to the SRAM timing parameter.

* * * * *